(12) United States Patent
Loeb et al.

(10) Patent No.: US 12,466,865 B2
(45) Date of Patent: Nov. 11, 2025

(54) METHOD AND KIT FOR TREATING A NEURODEGENERATIVE DISEASE

(71) Applicant: THE BOARD OF TRUSTEES OF THE UNIVERSITY OF ILLINOIS, Urbana, IL (US)

(72) Inventors: Jeffrey A. Loeb, Chicago, IL (US); Fei Song, Troy, MI (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 722 days.

(21) Appl. No.: 17/415,156

(22) PCT Filed: Jan. 2, 2020

(86) PCT No.: PCT/US2020/012025
§ 371 (c)(1),
(2) Date: Jun. 17, 2021

(87) PCT Pub. No.: WO2020/142587
PCT Pub. Date: Jul. 9, 2020

(65) Prior Publication Data
US 2022/0041673 A1 Feb. 10, 2022

Related U.S. Application Data

(60) Provisional application No. 62/787,852, filed on Jan. 3, 2019.

(51) Int. Cl.
| | |
|---|---|
| *C07K 14/00* | (2006.01) |
| *A61K 45/06* | (2006.01) |
| *A61P 25/16* | (2006.01) |
| *A61P 25/28* | (2006.01) |
| *C07K 14/475* | (2006.01) |
| *C07K 14/82* | (2006.01) |
| *A61K 38/00* | (2006.01) |

(52) U.S. Cl.
CPC .......... *C07K 14/4756* (2013.01); *A61K 45/06* (2013.01); *A61P 25/16* (2018.01); *A61P 25/28* (2018.01); *C07K 14/82* (2013.01); *A61K 38/00* (2013.01); *C07K 2319/00* (2013.01)

(58) Field of Classification Search
CPC .......... C07K 14/4756; C07K 14/82; C07K 2319/00; A61K 45/06; A61K 38/00; A61K 38/1883; A61K 38/45; A61P 25/28
See application file for complete search history.

(56) References Cited

U.S. PATENT DOCUMENTS

| | | |
|---|---|---|
| 2005/0107601 A1 | 5/2005 | Loeb |
| 2007/0081992 A1 | 4/2007 | Pardridge et al. |
| 2008/0207484 A1 | 8/2008 | Loeb |

FOREIGN PATENT DOCUMENTS

| | | |
|---|---|---|
| WO | 2003012045 A2 | 2/2003 |
| WO | 2006017184 A2 | 2/2006 |

OTHER PUBLICATIONS

Yoav Ben-Shlomo, et al, Parkinson's Disease 1, The epidemiology of Parkinson's disease, Lancet 2024; 403: 283-92 (Year: 2024).*
International Preliminary Report on Patentability in PCT/US2020/012025 dated Jun. 16, 2021.
International Search Report and Written Opinion in PCT/US2020/012025 dated Mar. 17, 2020.
Ma, Z. et al. (2009) "Targeting Human Epidermal Growth Factor Receptor Signaling with the Neuregulin's Heparin-binding Domain," The Journal of Biological Chemistry 284(46):32108-32115.

* cited by examiner

*Primary Examiner* — Jeanette M Lieb
(74) *Attorney, Agent, or Firm* — Licata & Tyrrell P.C.; Jane Massey Licata

(57) ABSTRACT

A method and kit for treating a neurodegenerative disease or central nervous system disorder in a subject using a GlyB4 fusion protein is provided, as is a kit containing the same.

7 Claims, 6 Drawing Sheets
Specification includes a Sequence Listing.

SEQUENCE LISTING

<160> NUMBER OF SEQ ID NOS: 1

<210> SEQ ID NO 1
<211> LENGTH: 791
<212> TYPE: PRT
<213> ORGANISM: Artificial sequence
<220> FEATURE:
<223> OTHER INFORMATION: Synthetic polypeptide

<400> SEQUENCE: 1

Lys Lys Lys Glu Arg Gly Ser Gly Lys Lys Pro Glu Ser Ala Ala Gly
1               5                   10                  15

Ser Gln Ser Pro Ala Leu Pro Pro Arg Leu Lys Glu Met Lys Ser Gln
            20                  25                  30

Glu Ser Ala Ala Gly Ser Lys Leu Val Leu Arg Cys Glu Thr Ser Ser
        35                  40                  45

Glu Tyr Ser Ser Leu Arg Phe Lys Trp Phe Lys Pro Asn Gly Asn Glu
    50                  55                  60

Leu Asn Arg Lys Asn Lys Gln Asn Ile Lys Ile Gln Lys Lys Pro Gly
65                  70                  75                  80

Lys Ser Glu Leu Arg Ile Asn Lys Ala Ser Leu Ala Asp Ser Gly Glu
                85                  90                  95

Tyr Met Cys Lys Val Ile Ser Lys Leu Gly Asn Asp Ser Ala Ser Ala
            100                 105                 110

Asn Ile Thr Ile Val Glu Ser Asn Glu Ile Ile Thr Gly Met Pro Ala
        115                 120                 125

Ser Thr Glu Gly Ala Tyr Val Ser Ser Glu Ser Pro Ile Arg Ile Ser
    130                 135                 140

Val Ser Thr Glu Gly Ala Asn Thr Ser Ser Ser Thr Ser Thr Ser Thr
145                 150                 155                 160

Thr Gly Thr Ser Gly Thr Gln Ser Val Cys Ala Gly Thr Glu Asn Lys
                165                 170                 175

Leu Ser Ser Leu Ser Asp Leu Glu Gln Gln Tyr Arg Ala Leu Arg Lys
            180                 185                 190

Tyr Tyr Glu Asn Cys Glu Val Val Met Gly Asn Leu Glu Ile Thr Ser
        195                 200                 205

Ile Glu His Asn Arg Asp Leu Ser Phe Leu Arg Ser Val Arg Glu Val

```
                  210                 215                 220
Thr Gly Tyr Val Leu Val Ala Leu Asn Gln Phe Arg Tyr Leu Pro Leu
225                 230                 235                 240

Glu Asn Leu Arg Ile Ile Arg Gly Thr Lys Leu Tyr Glu Asp Arg Tyr
                    245                 250                 255

Ala Leu Ala Ile Phe Leu Asn Tyr Arg Lys Asp Gly Asn Phe Gly Leu
                        260                 265                 270

Gln Glu Leu Gly Leu Lys Asn Leu Thr Glu Ile Leu Asn Gly Gly Val
                    275                 280                 285

Tyr Val Asp Gln Asn Lys Phe Leu Cys Tyr Ala Asp Thr Ile His Trp
                290                 295                 300

Gln Asp Ile Val Arg Asn Pro Trp Pro Ser Asn Leu Thr Leu Val Ser
305                 310                 315                 320

Thr Asn Gly Ser Ser Gly Cys Gly Arg Cys His Lys Ser Cys Thr Gly
                        325                 330                 335

Arg Cys Trp Gly Pro Thr Glu Asn His Cys Gln Thr Leu Thr Arg Thr
                    340                 345                 350

Val Cys Ala Glu Gln Cys Asp Gly Arg Cys Tyr Gly Pro Tyr Val Ser
                    355                 360                 365

Asp Cys Cys His Arg Glu Cys Ala Gly Gly Cys Ser Gly Pro Lys Asp
            370                 375                 380

Thr Asp Cys Phe Ala Cys Met Asn Phe Asn Asp Ser Gly Ala Cys Val
385                 390                 395                 400

Thr Gln Cys Pro Gln Thr Phe Val Tyr Asn Pro Thr Thr Phe Gln Leu
                        405                 410                 415

Glu His Asn Phe Asn Ala Lys Tyr Thr Tyr Gly Ala Phe Cys Val Lys
                    420                 425                 430

Lys Cys Pro His Asn Phe Val Val Asp Ser Ser Ser Cys Val Arg Ala
                    435                 440                 445

Cys Pro Ser Ser Lys Met Glu Val Glu Glu Asn Gly Ile Lys Met Cys
            450                 455                 460

Lys Pro Cys Thr Asp Ile Cys Pro Lys Ala Cys Asp Gly Ile Gly Thr
465                 470                 475                 480

Gly Ser Leu Met Ser Ala Gln Thr Val Asp Ser Ser Asn Ile Asp Lys
                        485                 490                 495

Phe Ile Asn Cys Thr Lys Ile Asn Gly Asn Leu Ile Phe Leu Val Thr
                    500                 505                 510

Gly Ile His Gly Asp Pro Tyr Asn Ala Ile Glu Ala Ile Asp Pro Glu
                    515                 520                 525

Lys Leu Asn Val Phe Arg Thr Val Arg Glu Ile Thr Gly Phe Leu Asn
                530                 535                 540

Ile Gln Ser Trp Pro Pro Asn Met Thr Asp Phe Ser Val Phe Ser Asn
545                 550                 555                 560

Leu Val Thr Ile Gly Gly Arg Val Leu Tyr Ser Gly Leu Ser Leu Leu
                        565                 570                 575

Ile Leu Lys Gln Gln Gly Ile Thr Ser Leu Gln Phe Gln Ser Leu Lys
                    580                 585                 590

Glu Ile Ser Ala Gly Asn Ile Tyr Ile Thr Asp Asn Ser Asn Leu Cys
                595                 600                 605

Tyr Tyr His Thr Ile Asn Trp Thr Thr Leu Phe Ser Thr Ile Asn Gln
            610                 615                 620

Arg Ile Val Ile Arg Asp Asn Arg Lys Ala Glu Asn Cys Thr Ala Glu
625                 630                 635                 640
```

-continued

```
Gly Met Val Cys Asn His Leu Cys Ser Ser Asp Gly Cys Trp Gly Pro
                645                 650                 655

Gly Pro Asp Gln Cys Leu Ser Cys Arg Arg Phe Ser Arg Gly Arg Ile
            660                 665                 670

Cys Ile Glu Ser Cys Asn Leu Tyr Asp Gly Glu Phe Arg Glu Phe Glu
        675                 680                 685

Asn Gly Ser Ile Cys Val Glu Cys Asp Pro Gln Cys Glu Lys Met Glu
    690                 695                 700

Asp Gly Leu Leu Thr Cys His Gly Pro Gly Pro Asp Asn Cys Thr Lys
705                 710                 715                 720

Cys Ser His Phe Lys Asp Gly Pro Asn Cys Val Glu Lys Cys Pro Asp
                725                 730                 735

Gly Leu Gln Gly Ala Asn Ser Phe Ile Phe Lys Tyr Ala Asp Pro Asp
            740                 745                 750

Arg Glu Cys His Pro Cys His Pro Asn Cys Thr Gln Gly Cys Asn Gly
        755                 760                 765

Pro Thr Ser His Asp Cys Ile Tyr Tyr Pro Trp Thr Gly His Ser Thr
    770                 775                 780

Leu Pro Gln His Ala Lys Asn
785                 790
```

METHOD AND KIT FOR TREATING A NEURODEGENERATIVE DISEASE

INTRODUCTION

This application is a U.S. National Stage Application of PCT/US2020/012025 filed Jan. 2, 2020 and claims benefit of priority to U.S. Provisional Patent Application Ser. No. 62/787,852, filed Jan. 3, 2019, the contents of which are incorporated herein by reference in their entirety.

This invention was made with government support under grant no. NS059947, awarded by the National Institutes of Health. The government has certain rights in this invention.

BACKGROUND

The neuregulins (NRGs) are a family of heparin-binding growth and differentiation factors with multiple functions in growth and development of the nervous system and heart, and cancer (Fischbach, et al. (1997) *Annu. Rev Neurosci.* 20:429-458). In one case, NRGs released from motor nerve endings at neuromuscular synapses activate members of the epidermal growth factor (EGF) family of tyrosine kinase receptors erbB2, erbB3 and erbB4 in the postsynaptic muscle membrane (Loeb, et al. (1999) *Development* 126: 781-791; Goodearl, et al. (1995) *J. Cell Biol.* 130:423-1434). NRGs are potent mitogens that are often released from certain tumor cells thus acting in an autocrine manner to activate the same family of receptors on the same tumor cells, resulting in enhanced proliferation and metastatic activity (Li, et al. (2004) *Cancer Res.* 64:7078-85).

A common feature of all NRGs is the epidermal growth factor-like (EGF-like) domain. This domain, even when expressed by itself, is sufficient for receptor binding and activation of homo- and heterodimers of erbB2, erbB3, and erbB4 receptors which are highly concentrated, for example, at the neuromuscular synapses in the postsynaptic muscle membrane (Altiok, et al. (1995) *EMBO J.* 14:4258-4266). Rapid autophosphorylation of the receptors' Tyr residues initiates a signaling cascade that translates the initial binding event into the induction of AChR genes (Corfas, et al. (1993) *Proc. Natl. Acad. Sci. USA* 90:1624-1628). This signaling cascade involves a number of signaling pathways including both the mitogen-activated protein (MAP) kinase pathway and phosphatidylinositol 3-kinase (PI3K) pathways (Si, et al. (1996) *J. Biol. Chem.* 271:19752-19759; Tansey, et al. (1996) *J. Cell Biol.* 134:465-476; Altiok, et al. (1997) *EMBO J.* 16:717-725).

Fusion polypeptides composed of the heparin-binding targeting domain (HBD) of NRG and an erbB4 extracellular domain have been described for use in treating cancer (WO 2006/017184 A2; US 2008/0207484 A1; US 2005/0107601 A1). In addition, it is suggested that such a fusion protein may be of use in treating a neurodegenerative disease, multiple sclerosis, stroke, epilepsy or traumatic brain, spinal cord or peripheral nerve injury (WO 2003/012045 A2). While it was demonstrated that the fusion protein could block tyrosine phosphorylation of the erbB receptor by NRG (WO 2003/012045 A2) and slow disease progression in the SOD1 mouse of model of Amyotrophic Lateral Sclerosis (Liu, et al. (2018) *Neurobiol. Dis.* 111:118-126) therapeutic activity in other neurodegenerative diseases was not demonstrated.

SUMMARY OF THE INVENTION

This invention provides a method of treating a neurodegenerative disease or central nervous system disorder in a subject by administering to the subject in need of treatment an effective amount of GlyB4 fusion protein, wherein the GlyB4 fusion protein penetrates the central nervous system thereby treating the subject's neurodegenerative disease or central nervous system disorder. In some embodiments, the step of administrating includes intraventricular, intrathecal, subcutaneous or intravenous delivery of the GlyB4 fusion protein to the subject. In other embodiments, the GlyB4 fusion protein is administered by delivering to the subject a cell expressing the fusion protein or a virus transduced with nucleic acids encoding the fusion protein. In certain embodiments, the neurodegenerative disease or central nervous system disorder is selected from Parkinson's disease, Alzheimer's disease, Huntington's disease, injury, multiple sclerosis, and stroke. In particular embodiments, the method further includes the step of administering a second therapeutic agent to effect treatment of the neurodegenerative disease or central nervous system disorder.

A kit for the treatment of a neurodegenerative disease or central nervous system disorder is also provided, which includes the GlyB4 fusion protein, a cell expressing the GlyB4 fusion protein or a virus transduced with nucleic acids encoding the GlyB4 fusion protein and one or more components used to package, sell, market, deliver, and/or administer the GlyB4 fusion protein, cell or virus. In some embodiments, the GlyB4 fusion protein, cell or virus is in admixture with a pharmaceutically acceptable carrier. In other embodiments, the one or more components comprise instructions fixed in a tangible medium of expression, wherein the instructions direct administration of the GlyB4 fusion protein, cell or virus to a subject in need thereof. In certain embodiments, the kit further includes a second therapeutic agent to effect treatment of the neurodegenerative disease or central nervous system disorder.

DETAILED DESCRIPTION OF THE INVENTION

Figure 1A:
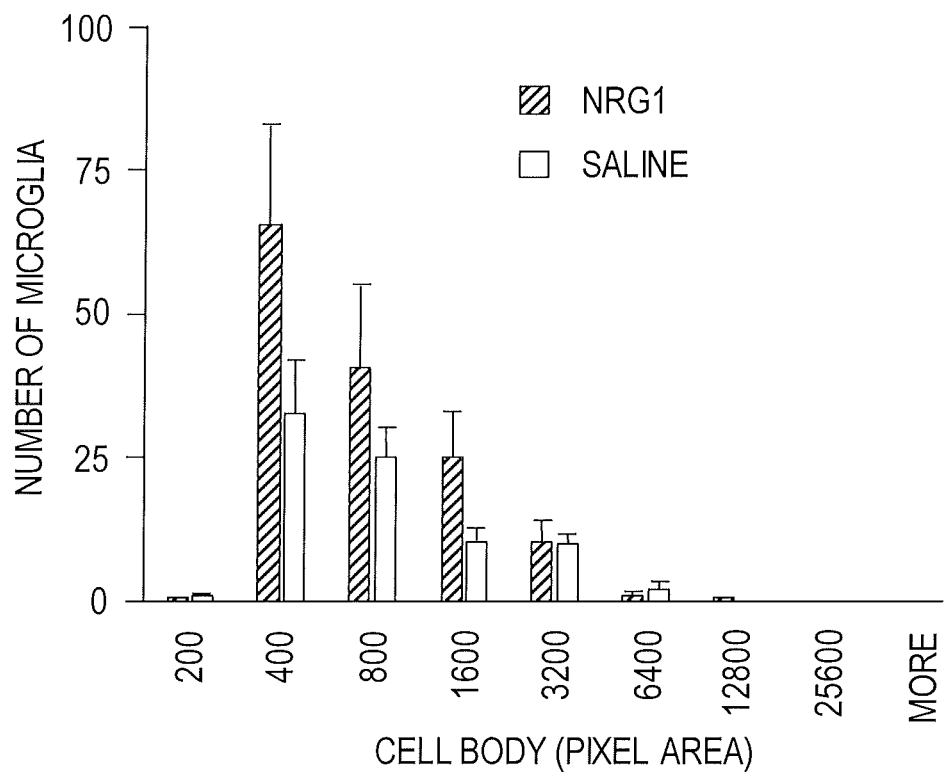
FIG. 1A-1B show that NRG1 treatment enhances microglial activation and Aβ-plaque formation in the brains of 5XFAD mice at an early disease stage (4 month of age). Mice were treated with NRG1 (5 nM in 5 µl saline, n=3 mice) or saline (5 µl, n=3 mice) as a control every week for 8 weeks (2-4 months of age). All of mouse brains at 4 months of age were collected and stained for microglia (FIG. 1A) and Aβ (FIG. 1B). Quantitative analysis of microglia and AP size/number in the amygdala and multiple other brain areas was conducted.
Figure 1B:
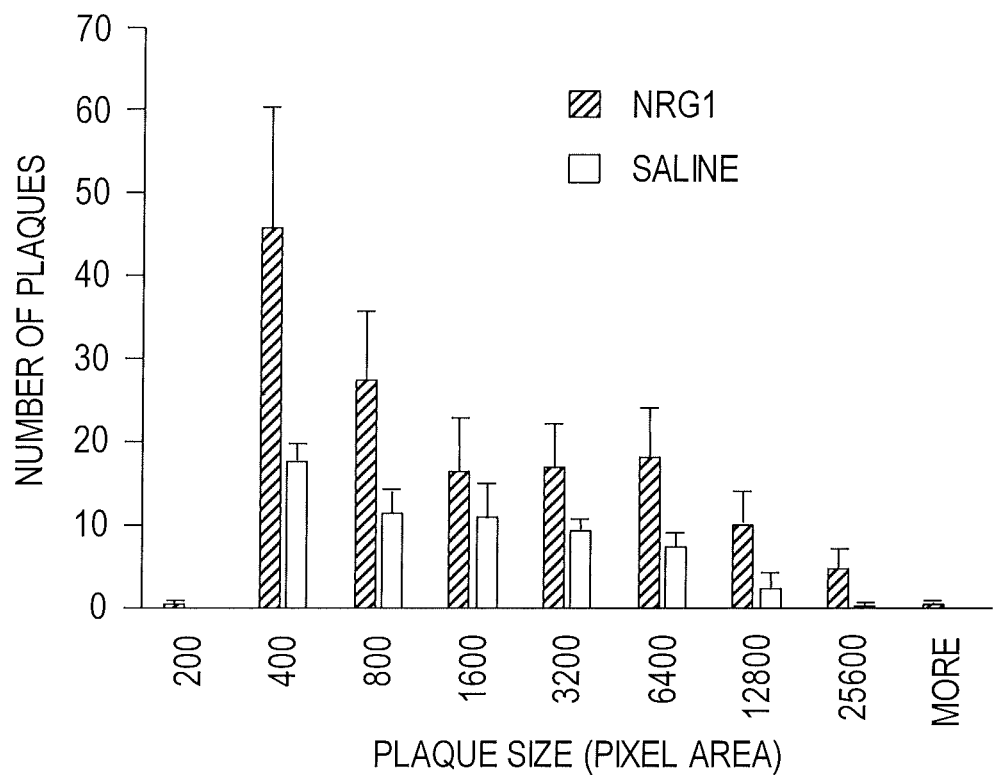
Figure 2:
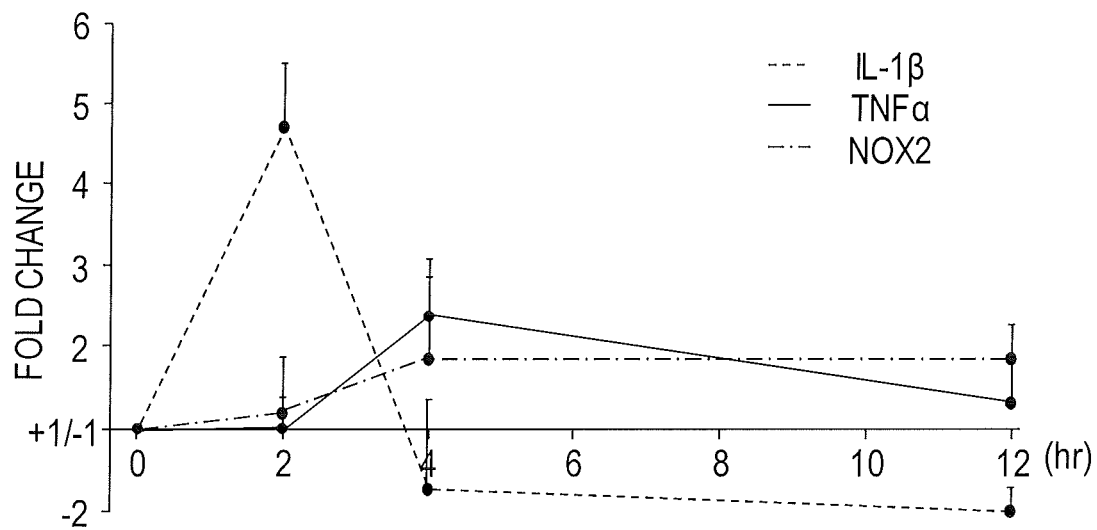
FIG. 2 shows that NRG1 treatment induces pro-inflammatory cytokine expressions in microglia in vitro. Microglia (gfp+CD45+) from CX3CR1-gfp mice were isolated (98.6% purity) and treated with 0.1 nM NRG1 or 0.1% BSA for 2, 4, or 12 hours. RNA isolation and PCR were performed. Each symbol represents the fold change (NRG1 vs 0.1% BSA) of pro-inflammatory cytokine expressions (IL-1β, TNFα and NOX2) at different time points from three replicate experiments.
Figure 3A:
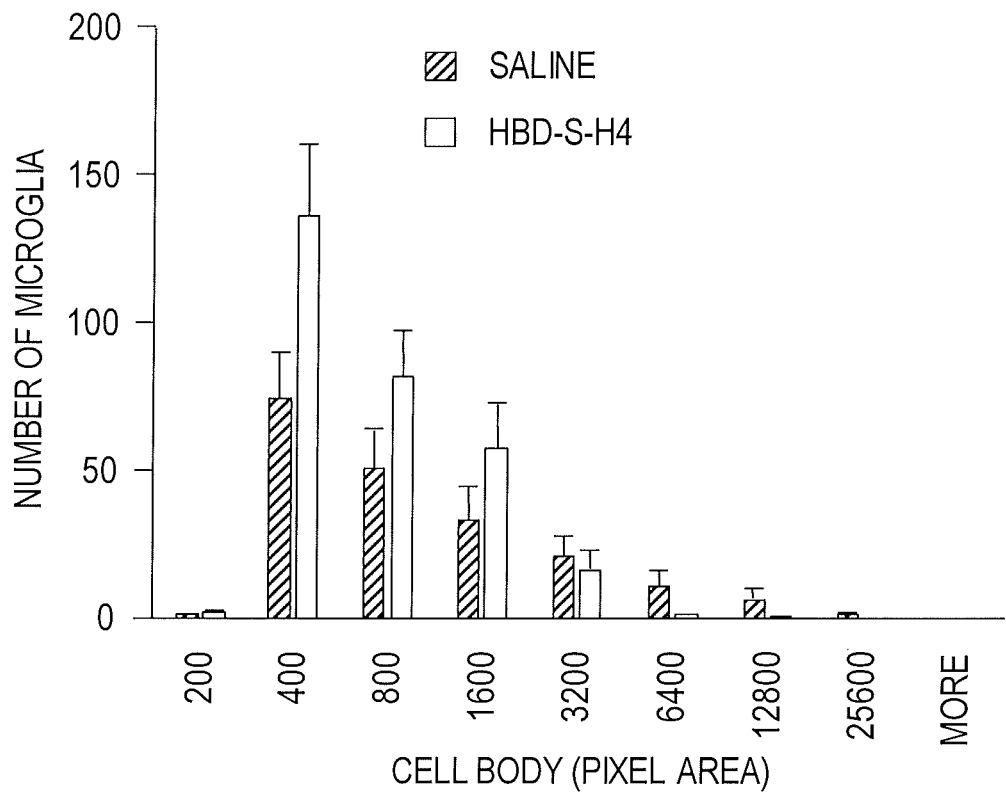
FIG. 3A-3B show that NRG1 antagonist treatment prevents microglial activation (FIG. 3A) and Aβ plaque formation (FIG. 3B) in the brains of 5XFAD mice at an early disease stage (4 month of age). Mice were treated with HBD-S-H4 (GlyB4) (4 µg in 5 µl saline, n=5 mice) or saline (5 µl, n=5 mice) as a control every week for 8 weeks (2-4 months of age). All of mouse brains at 4 months of age were collected and stained for microglia and Aβ. Quantitative analysis of microglia and Aβ size/number in the amygdala and multiple other brain areas was conducted.
Figure 3B:
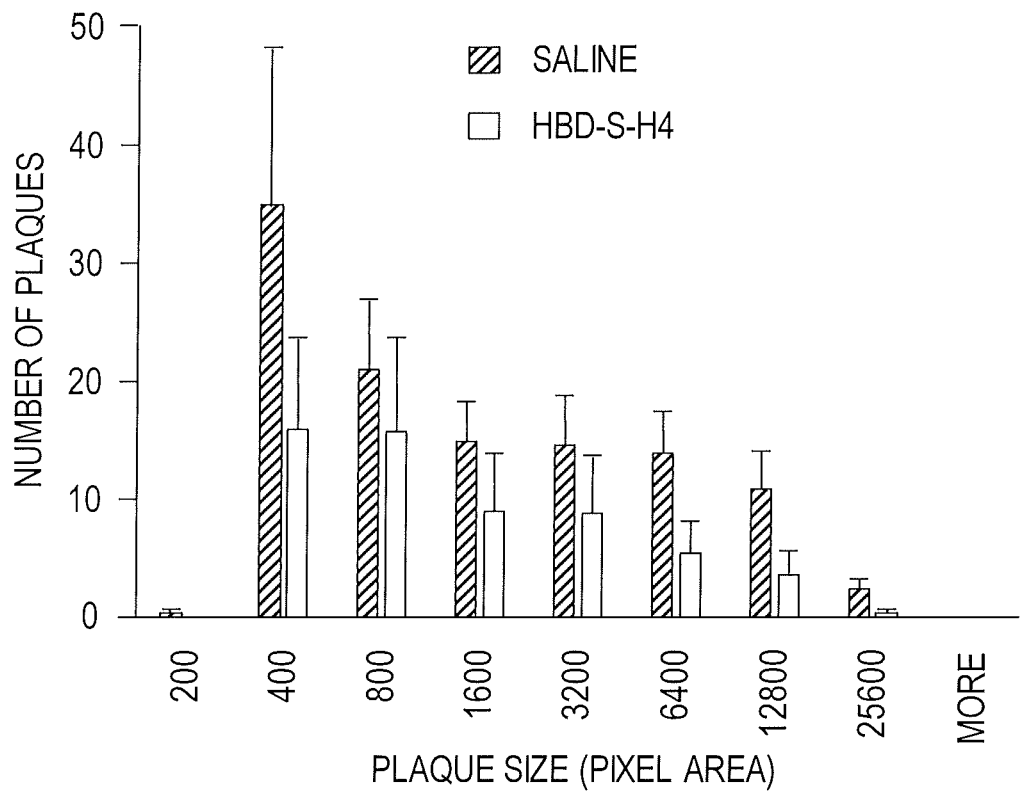
Figure 4:
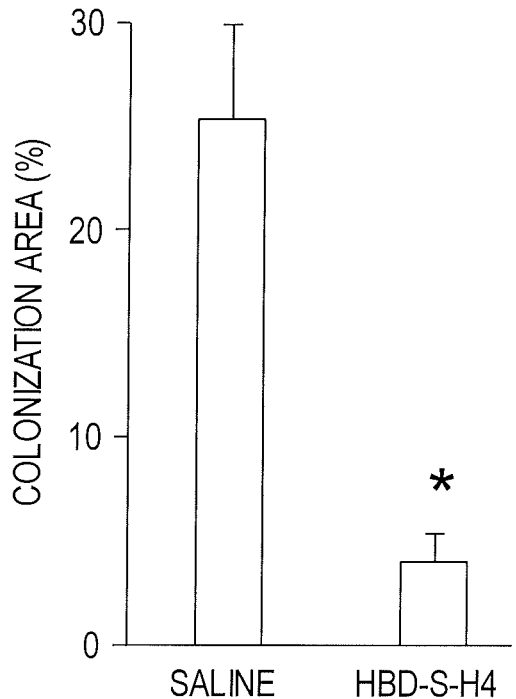
FIG. 4 shows that NRG1 antagonist treatment reduces NRG receptor activation on microglia in the brain of 5XFAD mice at 4 months of age. Eight-week-old 5XFAD mice with intracerebroventricular cannula implantations were treated weekly with HBD-S-H4 (GlyB4) (4 µg in 5 µl saline) or saline (5 µl) for 8 weeks (2-4-months of age). Brains were stained for NRG receptor activation (phosphorylated-erbB2), microglia (CD11b) and DAPI in the amygdala area HBD-S-H4-treated 5XFAD mice (n=5) were compared to saline-treated 5XFAD mice (n=5). Quantitation represents the percent of co-localized area (overlap between activated microglia and NRG receptor activation) measured at the right and left sides of amygdala of each mouse. Amygdales from each animal were selected from intact brain image scanned with a 20× objective lens, and quantified in a blinded manner using Metamorph software. A total of 20 amygdales (10 of saline and 10 of HBD-S-H4 treated group) were analyzed. *, p<0.05 by a Student's t-test.
Figure 5A:
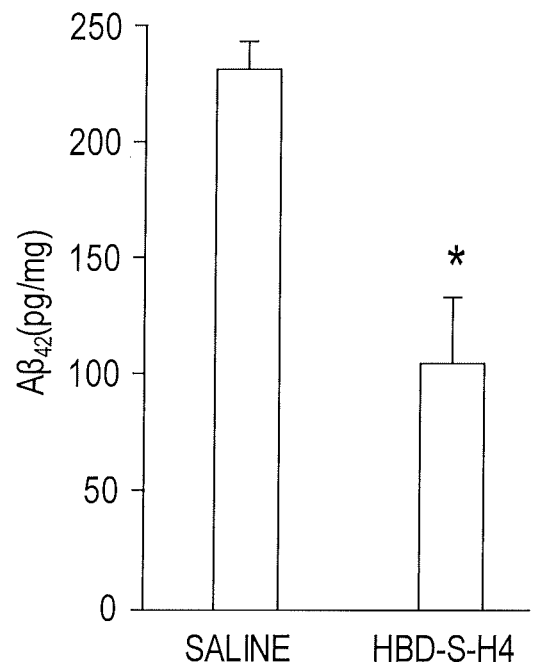
FIG. 5A-5C show decreased ratio of $A\beta_{42/40}$ in NRG1 antagonist-treated 5XFAD mice (4 month of age). Mice were treated with NRG1 antagonist HBD-S-H4 (GlyB4) (4 µg in 5 µl saline) or saline (5 µl) as a control every week for 8 weeks (2-4 months of age). Brain tissue lysates from HBD-S-H4 (GlyB4)- and saline-treated 5XFAD mice (4 months of age, n=3 mice/group) were analyzed using ELISA for $A\beta_{42}$ (FIG. 5A) and $A\beta_{40}$ (FIG. 5B) and ratio of the same (FIG. 5C). Statistical significance was measured using a student t test. p=0.06). *, p<0.05.
Figure 5B:
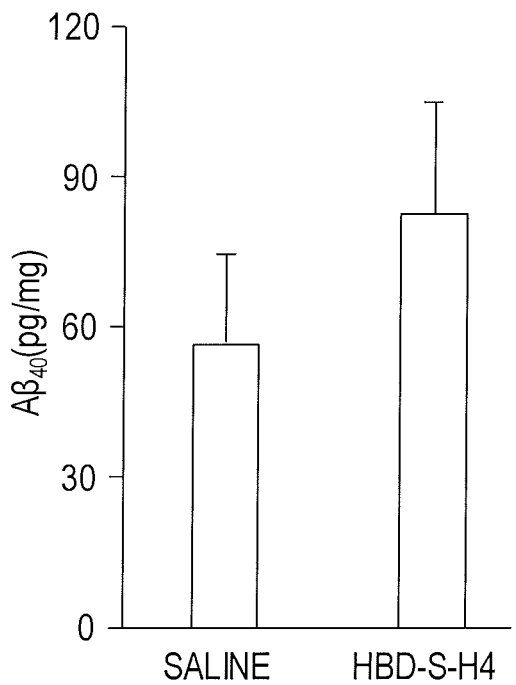
Figure 5C:
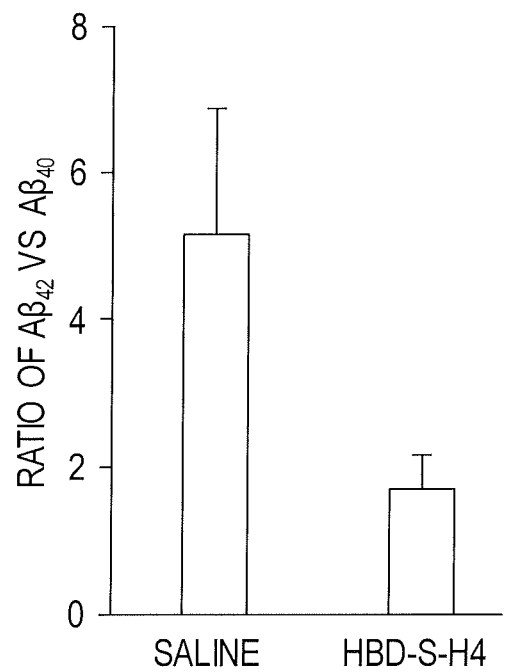
Figure 6A:
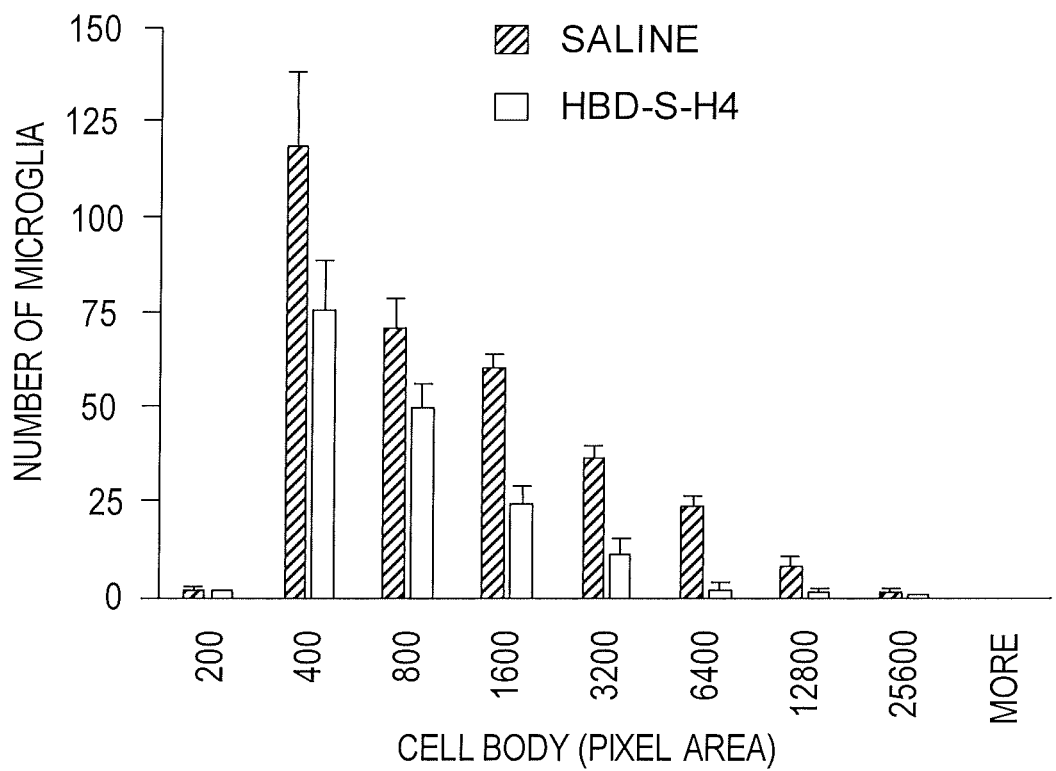
FIG. 6A-6B show that NRG1 antagonist treatment blocks microglial activation and Aβ plaque formation in the brains of 5XFAD mice during disease progression stage (6 month of age). Eight-week-old 5XFAD mice with intracerebroventricular cannula implantations were treated weekly with HBD-S-H4 (GlyB4) (4 µg in 5 µl saline, n=7 mice) or saline (5 µl, n=5 mice) for 8 weeks (4-6-months of age). Brains were stained for microglia and Aβ. Quantitative analysis of microglia and Aβ size/number in the amygdala and multiple other brain areas showed a decrease in large, activated microglial (FIG. 6A) and Aβ plaques (FIG. 6B).
Figure 6B:
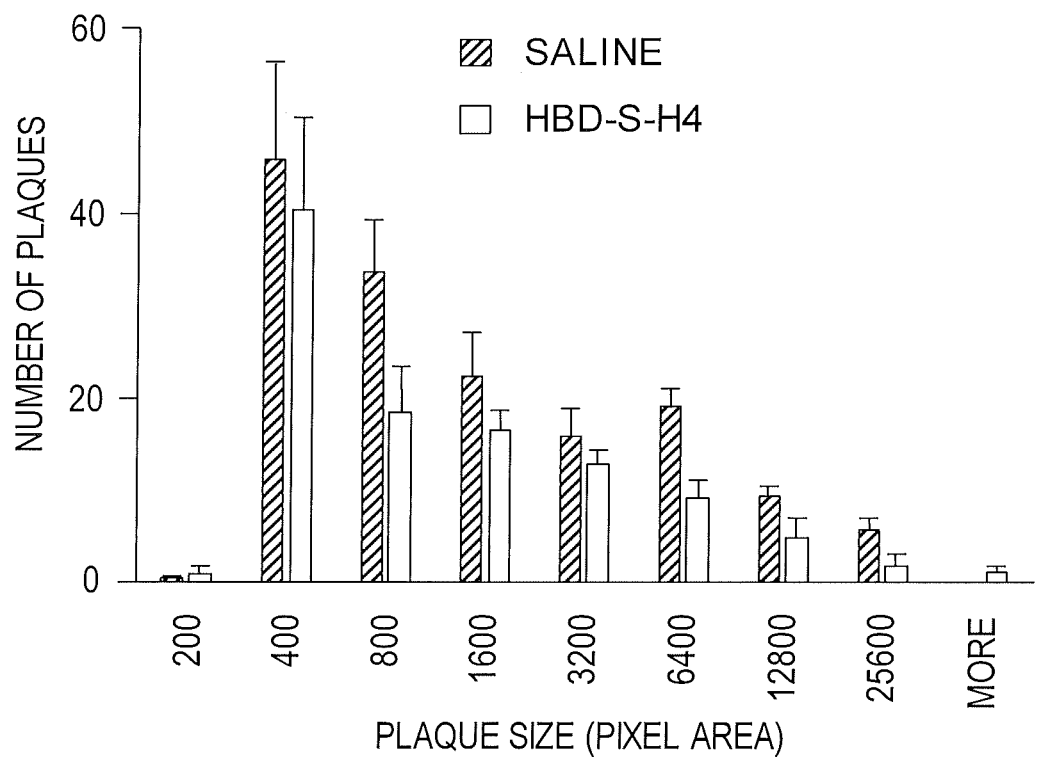
Figure 7A:
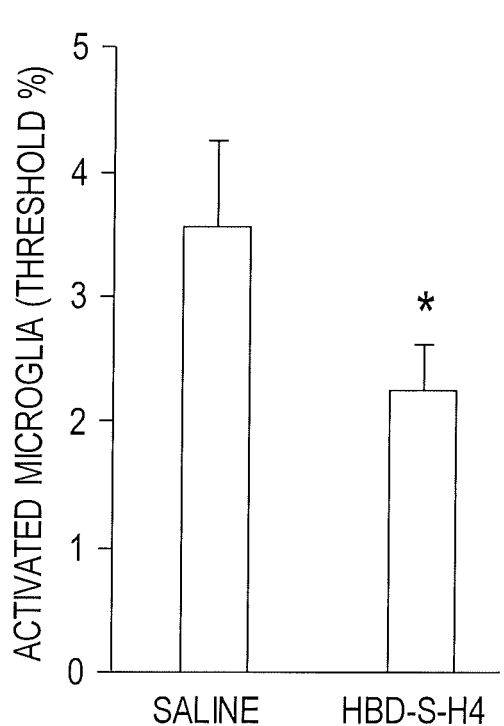
FIG. 7A-7B show that NRG1 antagonist reduces microglial and astrocyte pathology of 5XFAD mice at 6 months of age. Eight-week-old 5XFAD mice with intracerebroventricular cannula implantations were treated weekly with HBD-S-H4 (GlyB4) (4 µg in 5 µl saline, n=7 mice) or saline (5 µl, n=5 mice) for 8 weeks (4-6-months of age). Brains were stained for microglia (Iba1) and astrocyte (GFAP). Quantitative analysis of microglia and astrocyte in the amygdala and multiple other brain areas showed a decrease in activated microglial (FIG. 7A) and astrocyte pathology (FIG. 7B). *, p<0.05 by a Student's t-test
Figure 7B:
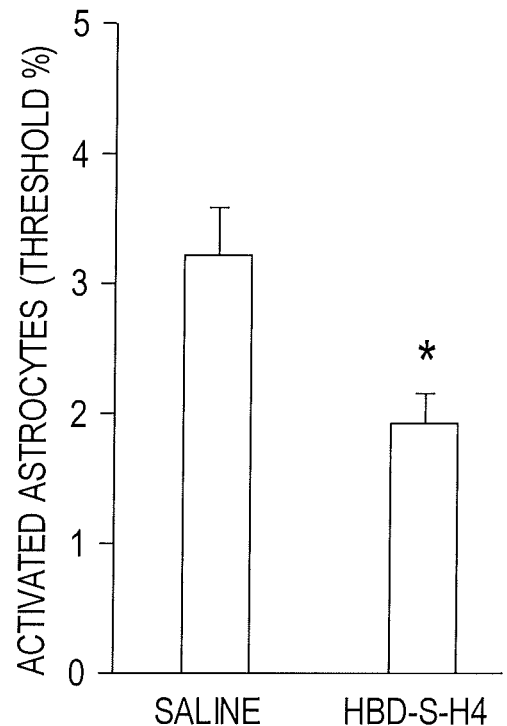
Figure 8A:
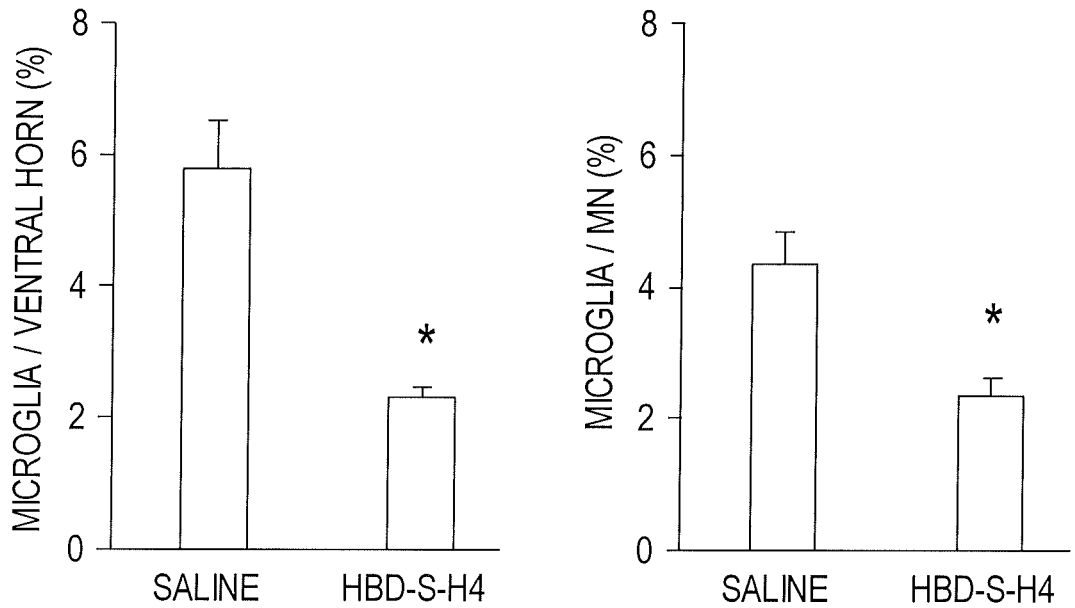
FIG. 8A-8C show that NRG1 antagonist treatment not only reduces activated microglia and rescues spinal motor neuron loss in the ventral horn (FIG. 8A-8B), but also increases synaptic density surrounding motor neurons (FIG. 8C) in SOD1 mice, an animal model of Amyotrophic Lateral Sclerosis (ALS). The NRG antagonist was used to treat SOD1 G93A mice for 8 weeks starting from a preclinical stage to disease onset (8-15 weeks). All of the SOD1 mice were sacrificed at the time of clinical disease onset of saline-treated mice (day 110), however, HBD-S-H4 (GlyB4) treated SOD1 mice did not show any clinical signs at this time. The NRG antagonist significantly inhibited NRG receptor activation (phosphorylated erbB2) expression on microglia in the ventral horn when compared to saline-treated SOD1 mice. Microglia are highly dynamic in their morphology, stages of activation and function. A close examination of these features demonstrates that HBD-S-H4 treatment reduced the amount of reactivity with smaller microglial with less processes compared to saline-treated SOD1 mice, and reduced activated microglia throughout the ventral horn (FIG. 8A, left panel) as well as in close proximity to motor neuron cell bodies (FIG. 8A, right panel). Those mice treated with HBD-S-H4 had higher numbers of motor neurons in the ventral horn (FIG. 8B) and reduced microglial activation, compared to the saline-treated animals (FIG. 8A). Synaptic density was quantified on individual motor neuron cell bodies using immunofluorescent staining for synaptophysin and Nissl bodies in the ventral horns of the lumbar spinal cord (FIG. 8C). Motor neurons with pixel area 4000 above and perimeter 500 above were used in this study. The percentage of the cell membrane on each motor neuron surrounded with stained synapses was determined using a custom script with Metamorph software. Synaptic Density (% MN cell body cross-section perimeter for positive synaptic stain) was compared between saline (n=4) and HBD-S-H4 (n=3) treated SOD1 animals. *, p<0.05 by a Student's t-test.
Figures 8B, 8C:
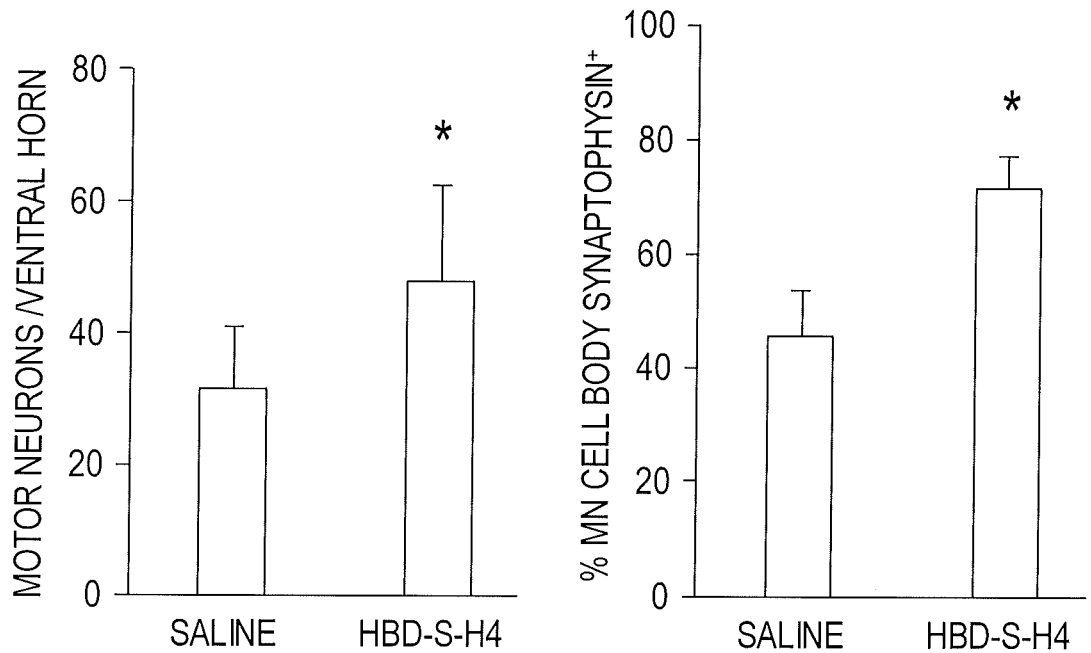

GlyB4 is a fusion protein that links a soluble decoy receptor (e.g., HER4) with a heparin-binding targeting domain (HBD) from the glial growth factor gene neuregulin 1 (NRG1). It is a potent, targeted antagonist that blocks the endogenous neuregulin signaling in vitro and in vivo at sites where neuregulin acts via the HBD fusion. It has now been shown that GlyB4 blocks inflammation and prevents plaque formation in a mouse model of Alzheimer's disease. In particular, while treatment 5XFAD mice with NRG1 resulted in an increase in large, activated microglial (FIG. 1A) and Aβ plaque formation (FIG. 1B) in the amygdala and multiple other brain areas, and induced pro-inflammatory cytokine expression in microglia in vitro (FIG. 2), treatment of 5XFAD mice with GlyB4 showed a decrease in large, activated microglial (FIG. 3A) and Aβ plaques (FIG. 3B) at an early disease stage with a concomitant decrease in NRG receptor activation on microglia (FIG. 4) and ratio of $A\beta_{42/40}$ (FIG. 5A-5C). Notably, GlyB4 treatment also blocked microglial activation (FIG. 6A) and Aβ plaque formation (FIG. 6B) during disease progression and reduced microglial (FIG. 7A) and astrocyte pathology (FIG. 7B). Similar results were observed in ALS-SOD1 mice, wherein GlyB4 treatment reduced microglial activation (FIG. 8A), increased the number of motor neurons in the ventral horn (FIG. 8B) and increased synaptic density (FIG. 8C). Having demonstrated that the GlyB4 fusion protein exhibits therapeutic activity in vivo in models of neurodegenerative diseases, particularly Alzheimer's disease, the present invention provides a method for treating a neurodegenerative disease or other central nervous system disorder by administering to a subject in need of such treatment and effective amount of the GlyB4 fusion protein.

As used herein, "GlyB4", "GlyB4 fusion polypeptide", "GlyB4 fusion protein" and "HBD-S-H4" refer to a fusion protein composed of the human neuregulin 1 (NRG1) heparin binding targeting domain (HBD) fused with the soluble ectodomain (ECD) of HER0. The preparation of GlyB4 is described in U.S. Pat. No. 7,994,123, incorporated herein by reference. An exemplary GlyB4 fusion protein has the amino acid sequence: KKKERGSGK KPESAAGSQS PALPPRLKEM KSQESAAGSK LVLRCETSSE YSSLRFKWFK PNGNELNRKN KQNIKIQKKP GKSEL-RINKA SLADSGEYMC KVISKLGNDS ASANITIVES NEIITGMPAS TEGAYVSSES PIRISVSTEG ANTSSSTSTS TTGTSgtqsV CAGTENKLSS LSDLEQQYRA LRKYYENCEV VMGNLEITSI EHNRDLSFLR SVREVTGYVL VALNQFRYLP LENLRIIRGT KLYEDRYALA IFLNYRKDGN FGLQELGLKN LTEILNGGVY VDQNKFLCYA DTIHWQDIVR NPWPSNLTLV STNGSSGCGR CHKSCTGRCW GPTENHCQTL TRTVCAEQCD GRCYGPYVSD CCHRECAGGC SGPKDTDCFA CMNFNDSGAC VTQCPQTFVY NPTTFQLEHN FNAKYTYGAF CVKKCPHNFV VDSSSCVRAC PSSKMEVEEN GIKMCKPCTD ICPKACDGIG TGSLMSAQTV DSSNIDKFIN CTKINGNLIF LVTGIHGDPY NAIEAIDPEK LNVFRTVREI TGFLNIQSWP PNMTDFSVFS NLVTIGGRVL YSGLSLLILK QQGITSLQFQ SLKEISAGNI YITDNSNLCY YHTINWTTLF STINQRIVIR DNRKAENCTA EGMVCNHLCS SDGCWGPGPD QCLSCRRFSR GRICIESCNL YDGEFREFEN GSICVECDPQ CEKMEDGLLT CHGPGPDNCT KCSHFKDGPN CVEKCPDGLQ GANSFIFKYA DPDRECHPCH PNCTQGCNGP TSHDCIYYPW TGHSTLPQHA KN (SEQ ID NO:1), wherein the HBD of NRG1 is underscored, spacer (S) is in bold, extraneous sequence is in lower case and erbB4 ECD is in normal uppercase text. In the context of this invention, GlyB4 acts as a targeted NGR antagonist that blocks the endogenous NGR signaling. In particular, GlyB4 blocks brain inflammation and both prevents and reverses this inflammation and plaque formation in a mouse model of Alzheimer's disease. In addition, GlyB4 slows disease progression by blocking inflammation in the spinal cord and rescuing motor neurons in an ALS animal model, indicating that this mechanism of action may have uses for many neurodegenerative conditions. GlyB4 derives its potent effect from its ability to penetrate the central nervous system, something not achieved by most other protein drugs including antibodies.

In some aspects, the step of administrating the GlyB4 fusion protein includes intraventricular, intrathecal, subcutaneous or intravenous delivery of the fusion protein. In particular aspects, the GlyB4 fusion protein is administered by intraventricular delivery. In accordance with such aspects, the present invention provides for the use of the GlyB4 fusion protein in a pharmaceutical composition for the treatment of a neurodegenerative disease or central nervous system disorder, wherein the pharmaceutical composition includes the GlyB4 fusion protein in admixture with a pharmaceutically acceptable carrier. As used herein, "pharmaceutically acceptable carrier" includes any and all diluents, solvents, dispersion media, coatings, antibacterial and antifungal agents, isotonic and absorption delaying agents, and the like. The use of such media and agents for pharmaceutically active substances is well-known in the art. Except insofar as any conventional media or agent is incompatible with the active compound, use thereof in the therapeutic compositions is contemplated. Supplementary active compounds can also be incorporated into the compositions.

Preferred pharmaceutically acceptable diluents include saline and aqueous buffer solutions. Pharmaceutical compositions suitable for injection include sterile aqueous solutions or dispersions and sterile powders for the extemporaneous preparation of sterile injectable solutions or dispersion. Isotonic agents, for example, sugars, polyalcohols such as mannitol, sorbitol, sodium chloride may be included in the pharmaceutical composition. In all cases, the composition should be sterile and should be fluid. It should be stable under the conditions of manufacture and storage and must include preservatives that prevent contamination with microorganisms such as bacteria and fungi. Dispersions can also be prepared in glycerol, liquid polyethylene glycols, and mixtures thereof and in oils. Under ordinary conditions of storage and use, these preparations may contain a preservative to prevent the growth of microorganisms.

The carrier can be a solvent or dispersion medium containing, for example, water, ethanol, polyol (for example, glycerol, propylene glycol, and liquid polyethylene glycol, and the like), and suitable mixtures thereof. The proper fluidity can be maintained, for example, by the use of a coating such as lecithin, by the maintenance of the required particle size in the case of dispersion and by the use of surfactants.

Prevention of the action of microorganisms can be achieved by various antibacterial and antifungal agents, for example, parabens, chlorobutanol, phenol, ascorbic acid, thimerosal, and the like.

Prolonged absorption of the injectable compositions can be brought about by including in the composition an agent which delays absorption, for example, aluminum monostearate and gelatin.

Parenteral compositions are preferably formulated in dosage unit form for ease of administration and uniformity of dosage. Dosage unit form refers to physically discrete units suited as unitary dosages for a mammalian subject; each unit contains a predetermined quantity of active compound calculated to produce the desired therapeutic effect in association with the required pharmaceutical carrier. The specification for the dosage unit forms of the invention are dictated by and directly dependent on (a) the unique characteristics of the active compound and the particular therapeutic effect to be achieved, and (b) the limitations inherent in the art of compounding such an active compound for the treatment of sensitivity in individuals.

In other aspects, the step of administrating the GlyB4 fusion protein is achieved by delivering to the subject a cell expressing the GlyB4 fusion protein. In still other aspects, the GlyB4 fusion protein is administered by delivering to the subject a virus transduced with nucleic acids encoding the GlyB4 fusion protein. DNA delivery to animals, for example to effect what is generally known as "gene therapy," or to cells ex vivo, involves introduction of a "foreign" DNA into a cell and ultimately, into a live animal. As used herein, the term "gene therapy" is not intended to be limited to the correction or replacement of a deficient gene in vivo, rather, the delivery of a nucleic acid, preferably a DNA molecule, of the present invention (not necessarily a "gene") in a manner permitting it expression and thereby, its utility as described. Several general strategies for gene therapy have been studied and have been reviewed extensively (Yang (1992) *Crit. Rev. Biotechnol.* 12:335-56; Anderson (1992) *Science* 256:808-13; Miller (1992) *Nature* 357:455-60; Crystal (1992) *Amer. J. Med.* 92(suppl 6A):44S-52S; Zwiebel, et al. (1991) *Ann. N.Y. Acad. Sci.* 618:394-404; McLachlin, et al. (1992) *Prog. Nucl. Acid Res. Molec. Biol.* 38:91-135 (1990) and the like.

One approach includes nucleic acid transfer into primary cells in culture followed by autologous transplantation (implantation) of the ex vivo transformed cells into the host, either systemically or into a particular organ or tissue. Nucleic acid transfer can be achieved using a number of approaches described herein. These systems can be tested for successful expression in vitro by use of a selectable marker (e.g., G418 resistance) to select transfected clones expressing the nucleic acid, followed by detection of the presence of the GlyB4 fusion protein using an antibody to the product in an appropriate immunoassay. Efficiency of the procedure, including nucleic acid uptake, integration and stability of integrated nucleic acid, can be improved by using a linearized nucleic acid (e.g., a linearized plasmid harboring nucleic acid encoding the GlyB4 fusion protein) using known methods, and co-transfection using high molecular weight mammalian DNA as a "carrier".

Examples of successful transfer reported in the art include direct injection of plasmid DNA into mouse muscle tissues, which led to expression of marker genes for an indefinite period of time (Wolff, et al. (1990) *Science* 247:1465; retroviral vectors are effective for in vivo and in situ infection of blood vessel tissues; portal vein injection and direct injection of retrovirus preparations into liver effected gene transfer and expression in vivo (Horzaglou, et al. (1990) *J. Biol. Chem.* 265:17285; Ferry, et al. (1991) *Proc. Natl. Acad. Sci. USA* 88:838; intratracheal infusion of recombinant adenovirus into lung tissues was effective for in vivo transfer and prolonged expression of foreign genes in respiratory epithelium (Rosenfeld, et al. (1991) *Science* 252:431; and Herpes simplex virus vectors achieved in vivo DNA transfer into brain tissue (Ahmad, et al., eds, *Miami Short Reports—Advances in Gene Technology: The Molecular Biology of Human Genetic Disease*, Vol 1, Boehringer Mannheim Biochemicals, USA, 1991).

In some embodiments, a retroviral vector is used in the treatment method of this invention. Nucleic acids encoding the GlyB4 fusion protein may be packaged into retrovirus vectors using packaging cell lines that produce replication-defective retroviruses, as is well-known in the art (see, for example, Miller, et al. (1985) *Mol. Cell Biol.* 5:431-37). Safe and effective packaging cell lines for gene transfer are described in, e.g., U.S. Pat. No. 5,278,056. This approach can be used in a site-specific manner to deliver the retroviral vector to the tissue or organ of choice. Thus, for example, a catheter delivery system can be used (Nabel, et al. (1989) *Science* 244:1342).

Other virus vectors may also be used, including recombinant adenoviruses (Horowitz (1990) In: *Virology*, Fields, et al., eds, Raven Press, NY, p. 1679; Berkner (1992) *Curr. Top. Microbiol. Immunol.* 158:39-66; Strauss (1984) In: *The Adenoviruses*, Ginsberg ed., Plenum Press, NY, ch. 11), or herpes simplex virus (HSV) for neuron-specific delivery and persistence. Advantages of adenovirus vectors for human gene therapy include the fact that recombination is rare, no human malignancies are known to be associated with such viruses, the adenovirus genome is double-stranded DNA which can be manipulated to accept foreign genes of up to 7.5 kb in size, and live adenovirus is a safe human vaccine organisms. Adeno-associated virus is also useful for human therapy (Samulski, et al. (1991) *EMBO J.* 10:3941 and is within the scope of this invention.

Vaccinia virus which can be rendered non-replicating can express the DNA molecule of the present invention and is useful in the present therapeutic setting, particularly in humans (U.S. Pat. Nos. 5,225,336; 5,204,243; 5,155,020; 4,769,330; Sutter, et al. (1992) *Proc. Natl. Acad. Sci. USA* 89:10847-51; Fuerst, et al. (1989) *Proc. Natl. Acad. Sci. USA* 86:2549-2553; Falkner, et al. (1987) *Nucl. Acids Res.* 15:7192; Chakrabarti, et al. (1985) *Molec. Cell Biol.* 5:3403-3409). Descriptions of recombinant vaccinia viruses and other viruses containing heterologous DNA and their uses in immunization and DNA therapy are reviewed in Moss (1993) *Curr. Opin. Genet. Dev.* 3:86-90; Moss (1992) *Biotechnology* 20:345-62; Moss (1992) *Curr. Top. Microbiol. Immunol.* 158:25-38; Moss (1992) *Science* 252:1662-67; Piccini, et al. (1988) *Adv. Vir. Res.* 34:43-64; Moss, et al. (1983) *Gene Amplif. Anal.* 3:201-13.

In addition to virus-mediated gene transfer in vivo, physical means well-known in the art can be used for direct transfer of DNA, including administration of plasmid DNA and particle-bombardment mediated gene transfer may be used (Yang, et al. (1990) *Proc. Natl. Acad. Sci. USA* 87:9568; Williams, et al. (1991) *Proc. Natl. Acad. Sci. USA* 88:2726; Zelenin, et al. (1989) *FEBS Lett.* 244:65; Johnston, et al. (1991) *In Vitro Cell Dev Bio.* 27:11). Furthermore, electroporation, a well-known means to transfer genes into cell in vitro, can be used to transfer DNA molecules according to the present invention to tissues in vivo (Titomirov, et al. (1991) *Biochim. Biophys. Acta* 1088:131).

"Carrier mediated" gene transfer (or DNA delivery) has also been described (Wu, et al. (1989) *J. Biol. Chem.* 264:16985; Wu, et al. (1988) *J. Biol. Chem* 263:14621; Soriano, et al. (1983) *Proc. Natl. Acad. Sci. USA* 80:7128; Wang, et al. (1982) *Proc. Natl. Acad. Sci. USA* 84:7851; Wilson, et al. (1992) *J. Biol. Chem.* 267:963). Preferred carriers are targeted liposomes (Nicolau, et al. (1983) *Proc. Natl. Acad. Sci. USA* 80:1068; Soriano, et al. (1983) *Proc. Natl. Acad. Sci. USA* 80:7128) such as immunoliposomes, which can incorporate acylated mAbs into the lipid bilayer (Wang, et al. (1982) *Proc. Natl. Acad. Sci. USA* 84:7851). Polycations such as asialoglycoprotein/polylysine (Wu, et al. (1989) *J. Biol. Chem.* 264:16985) may be used, where the conjugate includes a molecule which recognizes the target tissue and a DNA binding compound to bind to the DNA to be transfected. Polylysine is an example of a DNA binding molecule which binds DNA without damaging it. This conjugate is then complexed with plasmid DNA according to the present invention for transfer.

Plasmid DNA used for transfection or microinjection may be prepared using methods well-known in the art, for example using the Qiagen procedure (Qiagen), followed by DNA purification using known methods, such as the methods exemplified herein.

In addition to viral vectors, naked DNA or RNA, engineered bacteria may be used as vectors. For example, any of a number of bacterial species may be used including *Salmonella*, BCG and *Listeria monocytogenes* (LM) (Hoiseth, et al. (1981) *Nature* 291:238-39; Poirier, et al. (1988) *J. Exp. Med.* 168:25-32; Sadoff, et al. (1988) *Science* 240:336-38; Stover, et al. (1991) *Nature* 351:456-60; Aldovini, et al. (1991) *Nature* 351:479-82; Schafer, et al. (1992) *J. Immunol.* 149:53-9; Ikonomidis, et al. (1994) *J. Exp. Med.* 180: 2209-18). The enteric routes of infection of such organisms is a promising characteristic for their use because they may be delivered orally.

For the utility of transduced nucleic acids encoding GlyB4 fusion proteins, stable or prolonged expression may be used or transient expression of the fusion protein may be sufficient for transduced cells to perform their "production" or "delivery" function.

Compositions within the scope of this invention include all compositions wherein the fusion protein, or a cell or virus harboring nucleic acids encoding the GlyB4 fusion protein, is contained in an amount as defined below that is effective to achieve its intended purpose. A therapeutically effective amount is a dosage that, when given for an effective period of time, achieves the desired pharmacological or clinical effect.

A therapeutically active amount of a GlyB4 fusion protein may vary according to factors such as the disease state, age, sex, and weight of the individual, and the ability of the protein to elicit a desired response in the individual and the method of administration. Dosage regimes may be adjusted to provide the optimum therapeutic response. For example, doses may be administered daily, weekly, or monthly or through continuous infusion methods and the dose may be proportionally reduced as indicated by the exigencies of the therapeutic situation. A therapeutically effective amounts of the protein, in a cell associated form may be stated in terms of the protein or cell equivalents.

Desirably, an effective amount of a GlyB4 fusion protein is between about 1 ng and about 1 gram per kilogram of body weight of the recipient, more preferably between about 1 µg and 100 mg/kg, more preferably, between about 100 µg and about 100 mg/kg. Dosage forms suitable for internal administration preferably contain (for the latter dose range) from about 0.1 mg to 500 mg of active ingredient per unit. Alternatively, an effective dose of cells expressing the GlyB4 fusion protein, such as transduced cells, is between about $10^4$ and $10^9$ cells, more preferably between about $10^6$ and $10^8$ cells per subject, preferably in split doses or through a viral vector. Those skilled in the relevant therapeutic arts will be able to adjust these doses without undue experimentation.

As demonstrated herein, the GlyB4 fusion protein reduces or ameliorates one or more signs or symptoms of a neurodegenerative disease or central nervous system disorder. Accordingly, the GlyB4 protein is of use in the amelioration or treatment of a neurodegenerative disease or central nervous system disorder in a subject in need of such treatment. As used herein, "a neurodegenerative disease or central nervous system disorder" refers to a group of neurological disorders that affect the structure or function of the brain or spinal cord. Representative neurodegenerative diseases or central nervous system disorders amenable to treatment with the fusion proteins of the invention include, but are not limited to addiction, anxiety, depression, psychosis, stroke, Alzheimer's disease, Parkinson's disease, attention-deficit hyperactivity disorder, migraine, epilepsy, vascular dementia, mental retardation, cerebrovascular encephalopathy, multiple sclerosis, brain tumors, cranial nerve neuropathies, mental retardation, Huntington's disease, injury, multiple sclerosis, stroke, and posttraumatic spinal cord injury. In some embodiments, the neurodegenerative disease or central nervous system disorder is selected from Parkinson's disease, Alzheimer's disease, Huntington's disease, injury, multiple sclerosis, and stroke. In particular embodiments, the neurodegenerative disease is Alzheimer's disease. In still other embodiments, the neurodegenerative disease is not amyotrophic lateral sclerosis.

Preferably, treatment with the GlyB4 fusion protein provides a measurable decrease in one or more signs or symptoms of the neurodegenerative disease or central nervous system disorder. Such signs or symptoms can include, but are not limited to size and/or number of activated microglia, size and/or number of amyloid beta plaques, amount of amyloid beta peptide (e.g., $A\beta_{40}$ and/or $A\beta_{42}$), and/or ratio of amyloid beta peptides (e.g., $A\beta_{42}/A\beta_{40}$). Desirably, there is at least a 10%, 20%, 30%, 40%, 50%, 60%, 70% or 80% reduction in one or more one or more signs or symptoms of the neurodegenerative disease or central nervous system disorder as compared to, e.g., the same signs or symptoms in a reference subject or the same subject prior to treatment with the GlyB4 fusion protein. Such a reduction in said signs or symptoms is expected to improve the well-being, slow disease progression, and improve cognitive and/or motor function of the subject being treated.

To facilitate treatment, this invention also provides a kit including the GlyB4 fusion protein, a cell expressing the GlyB4 fusion protein, a virus transduced with nucleic acids encoding the GlyB4 fusion protein, or a pharmaceutical composition including any one of the fusion protein, cell or virus; and one or more components used to package, sell, market, deliver, and/or administer the active agent. Such additional components include, but are not limited to, packaging, syringes, blister packages, bottles, and the like. The kit can contain the active agent in a single pharmaceutical formulation or in separate pharmaceutical formulations.

In some embodiments, the kit includes instructions printed on or otherwise contained in a tangible medium of expression. The instructions can provide information regarding the content of the active agent or pharmaceutical formulations contained therein, safety information regarding the active agents or pharmaceutical formulation(s) contained therein, information regarding the dosages, indications for use, and/or recommended treatment regimen(s) for the active agents and/or pharmaceutical formulations contained therein. In some aspects, the instructions provide directions for administering the active agents or pharmaceutical formulations to a subject in need thereof. In certain aspects, the kit is provided for the treatment of a neurodegenerative disease, in particular Alzheimer's disease and therefore provides instructions and additional components for the treatment of the same.

In other aspects of this invention, the GlyB4 fusion protein is used in conjunction with a second therapeutic agent to effect treatment, in particular synergistic treatment, of a neurodegenerative disease or central nervous system disorder. Such treatments can include the GlyB4 fusion protein in combination with:
  (i) an acetylcholinesterase inhibitor such as donepezil hydrochloride; or Adenosine $A_{2A}$ receptor antagonists such as Preladenant (SCH 420814) or SCH 412348;
  (ii) amyloid β (or fragments thereof), such as $A\beta_{1-15}$ conjugated to pan HLA DR-binding epitope (PADRE) or ACC-001 (Elan/Vyeth);
  (iii) antibodies to amyloid β (or fragments or oligomeric Aβ variants thereof), such as bapineuzumab, AAB-002 (Wyeth/Elan), or those disclosed in US 2015/0260731 A1;
  (iv) amyloid-lowering or -inhibiting agents (including those that reduce amyloid production, accumulation and fibrillization) such as colostrinin and bisnorcymserine (also known as BNC);
  (v) alpha-adrenergic receptor agonists such as clonidine;
  (vi) beta-adrenergic receptor blocking agents (beta blockers) such as carteolol;
  (vii) anticholinergics such as amitriptyline;
  (viii) anticonvulsants such as carbamazepine;
  (ix) antipsychotics, such as lurasidone (also known as SM-13496; Dainippon Sumitomo);
  (x) calcium channel blockers such as nilvadipine;
  (xi) catechol O-methyltransferase (COMT) inhibitors such as tolcapone;
  (xii) central nervous system stimulants such as caffeine;
  (xiii) corticosteroids such as prednisone;
  (xiv) dopamine receptor agonists such as apomorphine;
  (xv) dopamine receptor antagonists such as tetrabenazine;
  (xvi) dopamine reuptake inhibitors such as nomifensine maleate;
  (xvii) gamma-aminobutyric acid (GABA) receptor agonists such as baclofen;
  (xviii) histamine 3 ($H_3$) antagonists such as ciproxifan;
  (xix) immunomodulators such as glatiramer acetate (also known as copolymer-1);
  (xx) immunosuppressants such as methotrexate;
  (xxi) interferons, including interferon beta-1a and interferon beta-1b;

(xxii) levodopa (or its methyl or ethyl ester), alone or in combination with a DOPA decarboxylase inhibitor (e.g., carbidopa);
(xxiii) N-methyl-D-aspartate (NMDA) receptor antagonists such as memantine;
(xxiv) monoamine oxidase (MAO) inhibitors such as selegiline;
(xxv) muscarinic receptor (particularly M1 subtype) agonists such as bethanechol chloride;
(xxvi) neuroprotective drugs such as 2,3,4,9-tetrahydro-1H-carbazol-3-one oxime;
(xxvii) nicotinic receptor agonists such as epibatidine;
(xxviii) norepinephrine (noradrenaline) reuptake inhibitors such as atomoxetine;
(xxix) phosphodiesterase (PDE) inhibitors, for example, PDE9 inhibitors such as BAY 73-6691 (Bayer AG) and PDE 10 (e.g., PDE10A) inhibitors such as papaverine;
(xxx) other PDE inhibitors including (a) PDE1 inhibitors (e.g., vinpocetine), (b) PDE2 inhibitors (e.g., erythro-9-(2-hydroxy-3-nonyl)adenine), (c) PDE4 inhibitors (e.g., rolipram), and (d) PDE5 inhibitors (e.g., sildenafil);
(xxxi) quinolines such as quinine (including its hydrochloride, dihydrochloride, sulfate, bisulfate and gluconate salts);
(xxxii) β-secretase inhibitors such as WY-25105;
(xxxvii) γ-secretase inhibitors such as LY-411575 (Lilly);
(xxxiv) serotonin (5-hydroxytryptamine) 1A (5-$HT_{1A}$) receptor antagonists such as spiperone;
(xxxv) serotonin (5-hydroxytryptamine) 4 (5-$HT_4$) receptor agonists such as PRX-03140 (Epix);
(xxxvi) serotonin (5-hydroxytryptamine) 6 (5-$HT_6$) receptor antagonists such as mianserin;
(xxxvii) serotonin (5-HT) reuptake inhibitors such as alaproclate or citalopram;
(xxxviii) trophic factors, such as nerve growth factor (NGF), basic fibroblast growth factor (bFGF), neurotrophin-3 (NT-3), cardiotrophin-1, brain-derived neurotrophic factor (BDNF), neublastin, meteorin, and glial-derived neurotrophic factor (GDNF), and agents that stimulate production of trophic factors, such as propentofylline; and the like.

What is claimed is:

1. A method of reducing amyloid β plaque formation in a subject comprising administering to the subject in need of treatment an effective amount of GlyB4 fusion protein consisting of SEQ ID NO: 1, wherein the GlyB4 fusion protein penetrates the central nervous system thereby reducing amyloid β plaque formation.

2. The method of claim 1, wherein comprises intraventricular, intrathecal, administrating subcutaneous or intravenous delivery of the GlyB4 fusion protein to the subject.

3. A method of treating Alzheimer's disease in a subject comprising administering to the subject in need of treatment an effective amount of a composition formulated for intraventricular or intrathecal delivery of a GlyB4 fusion protein consisting of SEQ ID NO: 1, wherein said composition penetrates the brain and blocks brain inflammation and/or reduces amyloid β plaque formation thereby treating the subject's Alzheimer's disease.

4. The method of claim 3, wherein intraventricular delivery is via intracerebroventricular or intrathecal implantation.

5. A method of reducing brain inflammation in a subject comprising administering to the subject in need of treatment an effective amount of GlyB4 fusion protein consisting of SEQ ID NO:1, wherein the GlyB4 fusion protein penetrates the central nervous system thereby reducing brain inflammation in the subject.

6. The method of claim 5, wherein the subject has Alzheimer's disease.

7. The method of claim 5, wherein administrating comprises intraventricular, intrathecal, subcutaneous or intravenous delivery of the GlyB4 fusion protein to the subject.

* * * * *